3,384,647
HYDROGEN FLUORIDE CATALYZED
ESTERIFICATION PROCESS
Eugene J. Miller, Jr., Wheaton, and Ago Mais, La Grange Park, Ill., assignors to Armour and Company, Chicago, Ill., a corporation of Delaware
No Drawing. Filed Nov. 9, 1964, Ser. No. 410,015
11 Claims. (Cl. 260—410.9)

ABSTRACT OF THE DISCLOSURE

Long chain fatty acids and their anhydrides are esterified with straight or branched chain primary alcohols in almost quantitative yields by using HF in great excess.

---

This invention relates to the esterification of fatty acids, and more particularly to a novel highly economical method wherein fatty acids may be esterified, in almost quantitative yield.

Fatty acid esters have attained wide usage in various technologies. Frequently, soaps and detergents contain or even consist wholly of one or more fatty acid esters. Plasticizers for plastic may comprise singular or mixed fatty acid esters. Drying oils for paints and waxes depend upon the polymerization of their unsaturated fatty acid ester component to function. The newer plastics, such as the polyesters, comprise long chain polymers of acid esters. Such large scale usage should indicate to the reader that any improved method in synthesis of esters would be highly desirable.

Broadly, esterification is a fairly common practice in chemical synthesis. Two general techniques are usually involved. In the first, an organic acid is added to the double bond of an olefin. In the second, an organic acid is reacted with an organic alcohol to form the ester and water. In both, a catalyst is usually employed. And, while there are many known esterification catalysts, it appears that only certain ones are useful in one or the other techniques described above.

As reported in the Encyclopedia of Chemical Technology, volume 5, pages 787 and 788 (1950), many so called "esterification catalysts" exist. However, in actual practice and, as noted therein, many of these catalysts are undesirable because they are either corrosive, or cause side reactions as dehydration, isomerization, or polymerization, or are slow, or cause poor yields, especially where the reactants are fairly complex or where they are long chain compounds. Also many are quite specific.

For example, in U.S. Patent 2,414,999, ethyl acetate is produced from glacial acetic acid and ethylene (the first technique indicated above) in only a 49% yield using a mixed $BF_3$-HF catalyst. The catalyst combination of $BF_3$ and HF, in contrast to either one alone, is stated as being responsible for this high yield. But it is specific for the olefin type esterification. More recently, in U.S. Patent 3,005,846, HF alone is the recommended catalyst for carbonylation as well as esterification of an olefin. Where esterification is desired, an alcohol is used along with the HF. Unfortunately, the olefin reactant must be either of short chain length or cyclic and even then the yield is not as much as desired and there is polymerization if too much alcohol has been used. Obviously, better yields are extremely desirable from an economic viewpoint.

An object of this invention is to provide a novel esterification process of the second type, specifically, an acid by an alcohol.

Another object is to provide an esterification process of long chain fatty acids having exceptional yields, even quantitative. A further object is to provide an esterification process which utilizes liquid HF as a catalyst.

A still further object is to provide an esterification process which is relatively short in time and relatively mild in reaction conditions such as temperature and pressure for the reaction.

Another object is to provide an esterification process for long chain fatty acids which effects purer esters with better color than heretofore possible.

Other objects of the invention will in part be obvious and will in part appear hereinafter.

The invention accordingly comprises the several steps and the relation of one or more of such steps with respect to each of the others, and the compound possessing the features, properties, and the relation of elements, which are exemplified in the following detailed disclosure, and the scope of the invention will be indicated in the claims.

It has now been found that long chain fatty acids ($C_8$ to $C_{24}$), which includes their anhydrides, such as stearic or myristic acid, may be esterified with straight or branched chain primary alcohol in almost quantitative yields, provided that the liquid hydrogen fluoride (HF) catalyst is used in great excess whereby it constitutes the reaction medium. Relatively mild reaction temperatures may be used over a relatively short period of time to promote such substantially quantitative esterification of the fatty acid. No side reactions, polymerization, isomerization or degradation of the reactants or of the finished ester is noted. Thus quantitative yields are encountered. Furthermore, the product is purer and has extremely good color.

The invention is more aptly described by reference to specific examples which illustrate the invention in detail:

Example I.—n-Butyl stearate—solvent extraction

A 300 ml., stirred Monel autoclave is charged with liquid anhydrous hydrogen fluoride (168.1 gms., 8.4 moles) at —5° to —10° C. n-Butanol (20.8 gms., 0.28 mole) and stearic acid (19.9 gms., 0.07 mole) are then added to make a molar ratio of acid:alcohol:HF of 1:4:120. The reactor is then secured and the temperature raised to and maintained at 25° to 30° C. for two hours. The reaction mixture is cooled to 0° to —5° C. and then poured into 800–1000 ml. cold water. One liter of ether is added. The organic phase is then separated and washed with water until the washings are neutral (usually about six 300 ml. portions). The ether solution is dried over anhydrous sodium sulfate, then stripped in vacuo. Crude n-butyl stearate will be obtained as a clear yellow oil in 99.9% yield (23.85 gms).

*Analysis.*—Acid value 1.51. Saponification equiv. 341.5 (calc. 340.6).

Example II.—n-Butyl stearate—heat work-up

A 300 ml., stirred Monel autoclave is charged with liquid, anhydrous hydrogen fluoride (112.2 gms., 5.6 moles) at —5° to —10° C. n-Butanol (10.4 gms., 0.14 mole) and stearic acid (19.9 gms., 0.07 mole) are then added to make a molar ratio of acid:alcohol:HF of 1:2:80. The reactor is then secured and the temperature raised to and maintained at 25° to 30° C. for two hours. The reaction mixture is cooled to 0° to —5° C. and poured into a 250 ml. stainless steel beaker, a small amount being saved for conventional water dilution work-up. The reaction mass is then carefully heated up to 160° C. in one hour to vaporize the excess hydrogen fluoride and butyl alcohol. Crude n-butyl stearate will be obtained as a yellow oil in quantitative yield (24.1 gms.).

*Analysis.*—(Heat work-up): Acid value, 8.4. Saponification equiv. 330 (calc. 340.6). (Water work-up): Acid value, 7.04.

Example III.—n-Propyl myristate

A 400 ml. polyethylene beaker equipped with a magnetic stirrer and thermocouple is charged with liquid, anhydrous hydrogen fluoride (100 gms., 5 moles) at 0° to 5° C. A solution of myristic acid (14.3 gms., 0.062 mole) in n-propanol (44.2 gms., 0.737 mole) is added slowly, over 12 minutes, to the stirred hydrogen fluoride. The temperature will rise to 13° to 15° C. during the addition and it is maintained there for 15 minutes after the addition is complete. The reaction mixture is then poured into 1250 ml. cold water and about 800 ml. ether added. The organic phase is then separated and washed with 300 ml. portions of water until the washings are neutral (about seven times). Crude n-propyl myristate will be obtained in almost quantitative yield (17.0 gms.) as a yellow oil.

*Analysis.*—Acid value, 14.65. Free fatty acid, 6.0%.

Examples IV to X

The time, temperature, and stoichiometry of the hydrogen fluoride catalyzed esterification of stearic acid with n-butanol is varied to determine the effect on the final product. The following results, as indicated by the acid values, are obtained:

TABLE I

| Alcohol | Mole Ratio Acid:Alc:HF | Time (Hours) | Temp., °C. | Acid Value (AV) |
| --- | --- | --- | --- | --- |
| n-Butanol | 1:2:80 | 2 | 25-30 | 4.63 |
| Do | 1:2:80 | 2 | 45-50 | 10.10 |
| Do | 1:2:120 | 2 | 25-30 | 4.98 |
| Do | 1:4:80 | 2 | 25-30 | 1.60 |
| Do | 1:4:80 | 4 | 25-30 | 1.86 |
| Do | 1:6:80 | 2 | 25-30 | 1.09 |
| Do | 1:2:80 | 2 | 25-30 | [1] 7.04 / [2] 8.40 |

[1] AV on product worked up by water-dilution method.
[2] AV on product worked up by driving HF off by heat.

From the above table, and other data, it is evident that higher reaction temperatures result in products with higher acid values which is obviously undesirable. Increasing amounts of alcohol result in lower acid values which is desirable, while longer reaction times and additional hydrogen fluoride (over 80 moles) appear to have little effect on the acid value. Work-up by heating vs. water-dilution techniques result in small increases in acid values and slight darkening of product. Thus, it can be concluded that the moderate temperature conditions (indicated hereinafter in detail as being operable) are quite important for good product and good yield.

The acids that may be esterified by the method of this invention are the long chain ($C_8$ to $C_{24}$) fatty acids, such as caprylic acid, capric acid, lauric acid, myristic acid, palmitic acid, stearic acid, arachidic acid, behenic acid, and lignoceric acid, and mixtures of such acids as found in the natural fats and oils, especially tallow, cottonseed oil and soybean oil.

The term "acids" as used herein includes the acid as well as its anhydrides.

Among the alcohols that may be used to esterify the above acids are the straight and branched chain primary alcohols having from 1 to 24 carbon atoms, such as methyl alcohol, ethyl alcohol, propyl alcohol, butyl alcohol, isobutyl alcohol, pentyl alcohol, isopentyl alcohol, hexyl alcohol, 3-methylpentyl alcohol, 2,2-dimethylbutyl alcohol, heptyl alcohol, octyl alcohol, 2-ethylhexyl alcohol, nonyl alcohol, decyl alcohol, cetyl alcohol, isocetyl alcohol and the like. The molar ratio of alcohol to acid should range from 2 to 1 to 8 to 1.

The amount of catalyst-solvent, HF, employed should range between 15 to 500 moles of the fatty acid utilized.

The temperature of reaction may range from −20° to +60° C. followed by stirring at temperatures between −20° to +60° C.

After formation, the ester is separated by the usual separation techniques such as dilution with water and separation with or without the aid of extraction solvents, such as ether, Skellysolve, benzene, chlorinated hydrocarbons, or any other suitable solvent. Prior to such separation and/or extraction from the ester, the organic layer may be purified and/or washed. Alternatively, the HF and excess alcohol may be removed by distillation without water dilution and solvent extraction.

It will thus be seen that the objects set forth above, among those made apparent from the preceding description, are efficiently attained and, since certain changes may be made in carrying out the above method set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. The method of esterifying long chain fatty acids and their anhydrides in almost quantitative yield, in purer form and with better color with straight and branched chain primary alcohols comprising adding at least one selected acid of said fatty acids and at least one selected alcohol from the group consisting of straight and branched chain primary alcohols to a substantial excess of liquid hydrogen fluoride whereby it constitutes the reaction medium and catalyst combined and then separating the resultant ester of said long chain fatty acid from the reaction mix.

2. The method of claim 1 wherein the quantity of said liquid hydrogen fluoride comprises 15 to 500 moles of the fatty acid.

3. The method of claim 1 wherein the molar ratio of alcohol to acid ranges from 2 to 1 to 8 to 1.

4. The method of claim 1 wherein the temperature of the reaction mix is maintained between −20° to +60° C.

5. The method of claim 1 wherein the fatty acid comprises stearic acid.

6. The method of esterifying long chain fatty acids and their anhydrides in almost quantitative yield, in purer form and with better color with straight and branched chain primary alcohols comprising adding at least one selected acid of said fatty acids and at least one selected alcohol from the group consisting of straight and branched chain primary alcohols to liquid hydrogen fluoride, said hydrogen fluoride being in a mole ratio of 15 to 500 moles of the fatty acid utilized, maintaining the resultant mixture at a temperature from −20° to +60° C. during the esterification reaction, thereafter stirring said mixture at said temperature to complete said esterification reaction, and then separating the resultant ester of said acid from said mixture.

7. The method of esterifying long chain fatty acids and their anhydrides in almost quantitative yield, in purer form and with better color with straight and branched chain primary alcohols comprising adding at least one selected acid of said fatty acids and at least one selected alcohol from the group consisting of straight and branched chain primary alcohols to liquid hydrogen fluoride, said hydrogen fluoride being in a mole ratio of 15 to 500 moles of the fatty acid utilized, maintaining the resultant mixture at a temperature from −20° to +60° C. during the esterification reaction, thereafter stirring said mixture at said temperature to complete said esterification reaction, and then separating the resultant ester of said acid from said mixture by diluting said mixture with water, and then separating the formed ester from the diluted mixture.

8. The method of esterifying long chain fatty acids and their anhydrides in almost quantitative yield, in purer form and with better color with straight and branched chain primary alcohols comprising adding at least one selected acid of said fatty acids and at least one selected alcohol of said straight and branched chain primary alcohols to liquid hydrogen fluoride, said hydrogen fluoride being in a mole ratio of 15 to 500 moles of the fatty acid utilized, maintaining the resultant mixture at a temperature from −20° to +60° C. during the esterification reaction, thereafter stirring said mixture at said temperature to complete said esterification reaction, and then separating the resultant ester of said long chain fatty acid from said mixture by distilling off the hydrogen fluoride and the excess alcohol.

9. The method of esterifying stearic acid in almost quantitative yield, in purer form and with better color with butyl alcohol comprising adding said acid and said alcohol in a molar alcohol to acid ratio of 1 to 1 to 4 to 1 to liquid hydrogen fluoride, said hydrogen fluoride being in a mole ratio of 15 to 500 moles of the fatty acid utilized, maintaining the resultant mixture at a temperature from −20° to +60° C. during the esterification reaction, thereafter stirring said mixture at said temperature to complete said esterification reaction, and then separating the resultant ester of said long chain fatty acid from said mixture.

10. The method of esterifying stearic acid in high yield with isocetyl alcohol comprising adding said acid and said alcohol in a molar alcohol to acid ratio of 1 to 1 to 4 to 1 to liquid hydrogen fluoride, said hydrogen fluoride being in a mole ratio of 15 to 500 moles of the fatty acid utilized, maintaining the resultant mixture at a temperature from −20° to +60° C. during the esterfication reaction, thereafter stirring said mixture at said temperature to complete said esterification reaction, and then separating the resultant ester of said long chain fatty acid from said mixture.

11. The method of esterifying myristic acid in high yield with butyl alcohol comprising adding said acid and said alcohol in a molar alcohol to acid ratio of 1 to 1 to 4 to 1 to liquid hydrogen fluoride, said hydrogen fluoride being in a mole ratio of 15 to 500 moles of the fatty acid utilized, maintaining the resultant mixture at a temperature from −20° to +60° C. during the esterification reaction, thereafter stirring said mixture at said temperature to complete said esterification reaction, and then separating the resultant ester of said long chain fatty acid from said mixture.

No references cited.

HENRY R. JILES, *Primary Examiner.*